United States Patent
Schalles et al.

(10) Patent No.: US 6,213,475 B1
(45) Date of Patent: Apr. 10, 2001

(54) SEPARATING PISTON FOR A VIBRATION DAMPING SYSTEM

(75) Inventors: Walter Schalles, Windeck-Rosbach; Rüdiger Detzel, Windeck; Dirk Litterscheid, Eitorf, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/216,454

(22) Filed: Dec. 18, 1998

(30) Foreign Application Priority Data

Dec. 18, 1997 (DE) .................................. 197 56 443

(51) Int. Cl.⁷ .......................................... F16J 9/00
(52) U.S. Cl. .................................. 277/466; 277/457
(58) Field of Search .................................. 277/434, 448, 277/452, 455, 456, 457, 466

(56) References Cited

U.S. PATENT DOCUMENTS

| | | | |
|---|---|---|---|
| 4,428,276 | * 1/1984 | Loveless | ............ 277/466 X |
| 4,809,991 | * 3/1989 | Blatt | ..................... 277/434 |
| 4,858,516 | 8/1989 | Klein . | |
| 5,607,166 | * 3/1997 | Gorman | ............ 277/466 X |
| 5,848,677 | 12/1998 | Beck et al. . | |

FOREIGN PATENT DOCUMENTS

| | | |
|---|---|---|
| 1 132 767 | 7/1962 | (DE) . |
| 75 10 084 | 2/1976 | (DE) . |
| 32 31 135 | 2/1984 | (DE) . |
| 34 05 028 A1 | 8/1985 | (DE) . |
| 2 073 846 | 10/1981 | (GB) . |
| 2 480 382 | 10/1981 | (FR) . |
| 5544125 | 3/1980 | (JP) . |

\* cited by examiner

*Primary Examiner*—Anthony Knight
*Assistant Examiner*—Karlena D. Schwing
(74) *Attorney, Agent, or Firm*—Cohen, Pontani, Lieberman & Pavane

(57) ABSTRACT

A separating piston for a vibration damping system with a cylinder which is filled partly with damping fluid and partly with pressure gas and with a separating piston which is arranged in the cylinder and divides the pressure gas space from the fluid space in a sealing manner via a seal. The separating piston is guided in the cylinder by a guide, wherein the separating piston is provided with an additional guide between the seal and the end side facing the pressure gas space. A chamber which is open relative to the inner wall of the cylinder is arranged in the area between the seal and the additional guide.

8 Claims, 3 Drawing Sheets

SEPARATING PISTON FOR A VIBRATION DAMPING SYSTEM

BACKGROUND OF THE INVENTION

1. Field of the Invention

The invention is directed to a separating piston for a vibration damping system, especially hydropneumatic vibration dampers or self-pumping level regulation devices, with a cylinder which is filled partly with damping fluid and partly with pressure gas and a separating piston which is arranged in the cylinder and divides the pressure gas space from the fluid space in a sealing manner by means of a seal. The separating piston is guided by a guide in the cylinder.

2. Discussion of the Prior Art

Separating pistons for hydropneumatic shock absorbers are already known (e.g., DE-PS 32 31 135). In separating pistons of this kind, the separating member located between the pressure gas space and the fluid space is constructed as a floating piston which serves to calm the surface of the fluid during operation of the damper. The pressure gas space is arranged in the vicinity of the lower work space filled with damping fluid and serves essentially to support the compression stage. The separating piston is used as a separating element. In the rebound stage of a vibration damping system, the pressure increases in the upper work space depending on the volume flow present at the pre-adjusted tension valve of the damping piston, whereas, in the compression stage, the pressure in the upper work space correspondingly decreases depending on the volume flow present at the pre-adjusted compression stage valve of the damping piston. The absolute pressure at the separating piston on the side of the gas space is virtually identical to that on the side of the fluid space. Vibration dampers which work on this principle are known as classic single-tube gas pressure dampers.

It is disadvantageous in these known single-tube gas pressure dampers that the separating piston can only be used for defined damping piston/piston rod diameter combinations. One such diameter combination which is known to be adequately dimensioned has, for example, a damping piston diameter of 36 mm combined with a piston rod diameter of 11 mm. A sufficient service life and resistance to wear is achieved over a broad temperature spectrum with this combination.

With less favorable diameter combinations, especially where the diameters of the piston rods are larger while retaining the previous diameter of the damping piston, the sealing element used in the separating piston can no longer adequately seal the damping fluid relative to the pressure gas space. As a rule, an impermissibly large amount of damping fluid is determined in the gas space in connection with an absolute change in position of the separating piston in the direction of the damping piston. This leads to total failure when the basic geometric data of the vibration damper are unfavorable, for example, in that the damping piston becomes permanently caught on the separating piston with low reserves. This substantially reduces the life expectancy of the vibration damper.

SUMMARY OF THE INVENTION

It is an object of the present invention to provide a simple and economical vibration damping system which has a sufficient service life over a wide temperature range even when the diameter combinations are unfavorable. Moreover, the response at small excitation amplitudes in the natural frequency range of the wheels is improved.

According to the invention, this object is met in that the separating piston is provided with an additional guide between the seal and the end side facing the pressure gas space, wherein a chamber which is open relative to the inner wall of the cylinder is arranged in the area between the seal and the additional guide.

In this construction, it is advantageous that the rigorous separation between the guiding functions and the sealing functions is carried out at the separating piston. The guiding functions are taken over by the guides, while the seal is responsible for the sealing function. The seal can be specifically designed for this purpose. Moreover, it is advantageous that the damping fluid is collected in the open chamber directly at the separating piston on the side facing the pressure gas space. The damping fluid remains in this additionally provided open chamber and is partially returned to the fluid space again, wherein this returning effect is explained by the fact that there is no pressure difference between the pressure gas space and the fluid space, so that the fluid is moved into the newly provided chamber and also back again into the fluid space by the pumping action (dragging current) at the seal.

According to one embodiment, an annular groove is provided as a chamber in the outer circumference of the separating piston. In this way, the open chamber can be incorporated in the outer wall of the separating piston by simple manufacturing techniques, wherein this chamber can be manufactured by cutting machining as well as by non-cutting machining.

In an another embodiment, at least one of the guides is constructed as an annular element.

The guide can be advantageously produced at least partially from a material provided with favorable friction characteristics. Teflon is a material with a favorable friction characteristic.

In order to prevent a pressure drop between the guide and the seal, the seal is acted upon directly by damping fluid. In this connection, the separating piston provides a recess through which the seal is acted upon by damping fluid.

An embodiment which is simple with respect to manufacturing technique is ensured when the hollow space remaining between the seal and the guide of the separating piston facing the gas space is constructed as a chamber.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
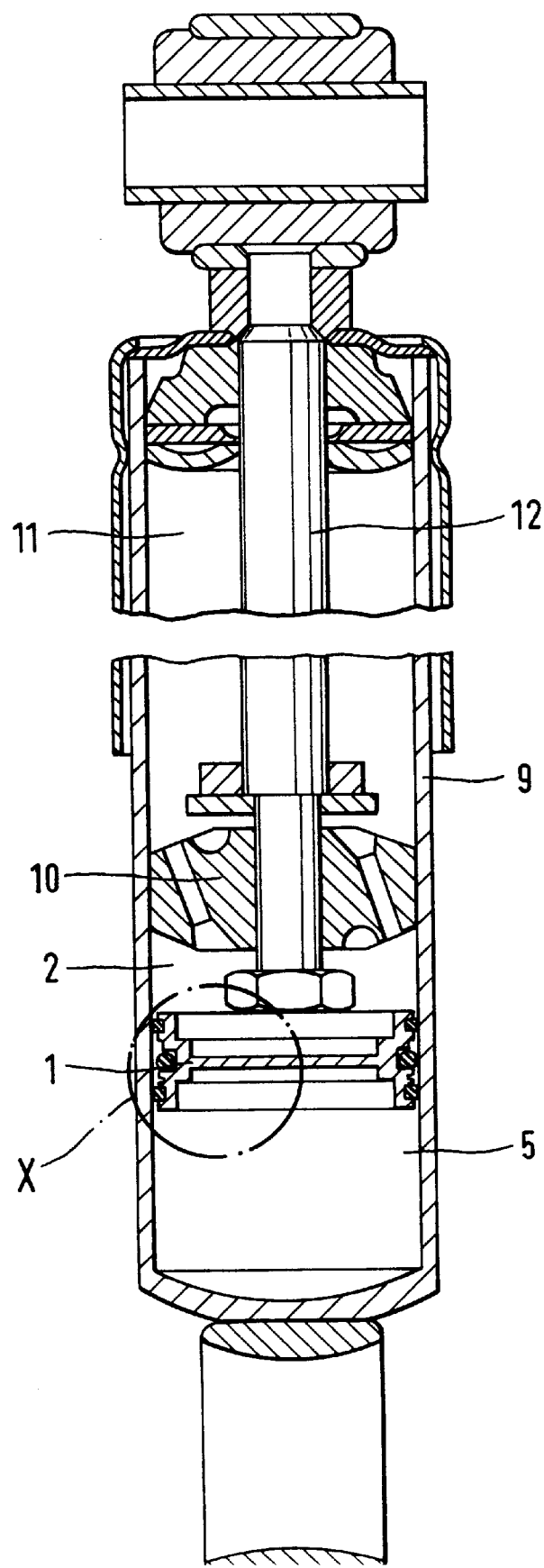
FIG. 1 shows an example of a vibration damping system in section.

The vibration damping system shown in FIG. 1 is constructed as a single-tube gas pressure damper and substantially comprises the working cylinder 9 in which a damping piston 10 is outfitted with damping valves and divides the working cylinder into an upper fluid space 11 and a lower fluid space 2. The damping piston 10 is connected with a piston rod 12. A pressure gas space 5 adjoins the lower fluid space 2, wherein the pressure gas space 5 is sealed and separated relative to the fluid space 2 by a separating piston 1.

Figure 2:
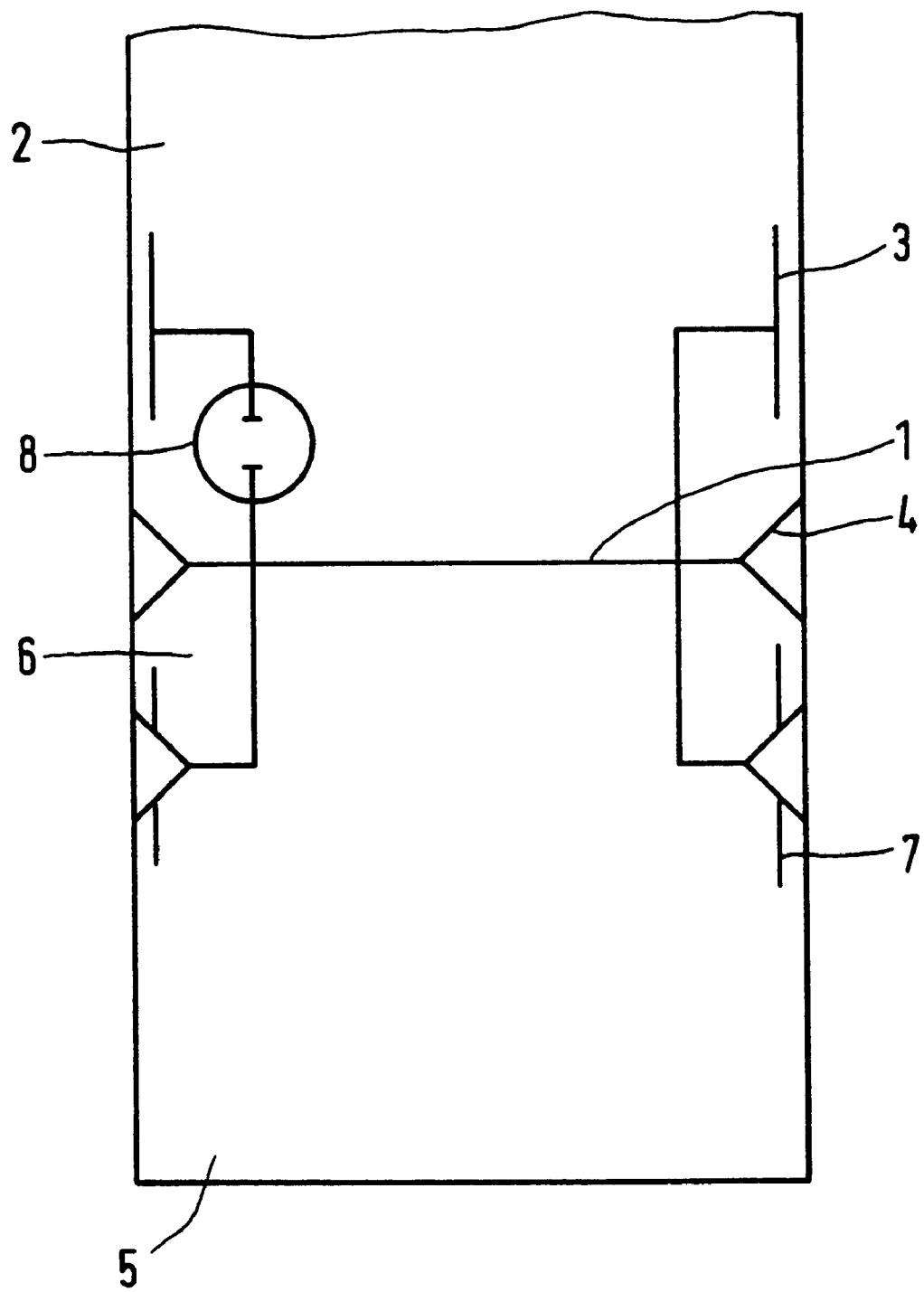
FIG. 2 is a schematic view of a detail of a separating piston.

FIG. 2 schematically shows a separating piston 1, wherein the separating piston 1 is provided, in each end area, with a guide 3 and an additional guide 7. A seal 4 which can be acted upon by the damping fluid of the fluid space 2 via a recess 8 is located between these two guides 3 and 7. An open chamber 6 is located between the seal 4 and the additional guide 7, wherein damping fluid exiting from the fluid space 2 can be collected in the open chamber 6 and returned to the fluid space 2 again via the seal 4.

The guide 3 and the additional guide 7 can be produced from a low-friction material such as TEFLON®, so that they are constructed as running partners relative to the working cylinder 9. The pretensioning of the seal 4 can accordingly be reduced at the same time (while retaining a sufficient level of sealing over the service life). For this purpose, it is provided by means of the recess 8 that the system pressure can be present at the seal 4 without choking. As a result of this, an improved response of the vibration damping system can be achieved in driving operation, especially with small vibration amplitudes and excitation frequencies in the frequency range of the wheel.

Figure 3:
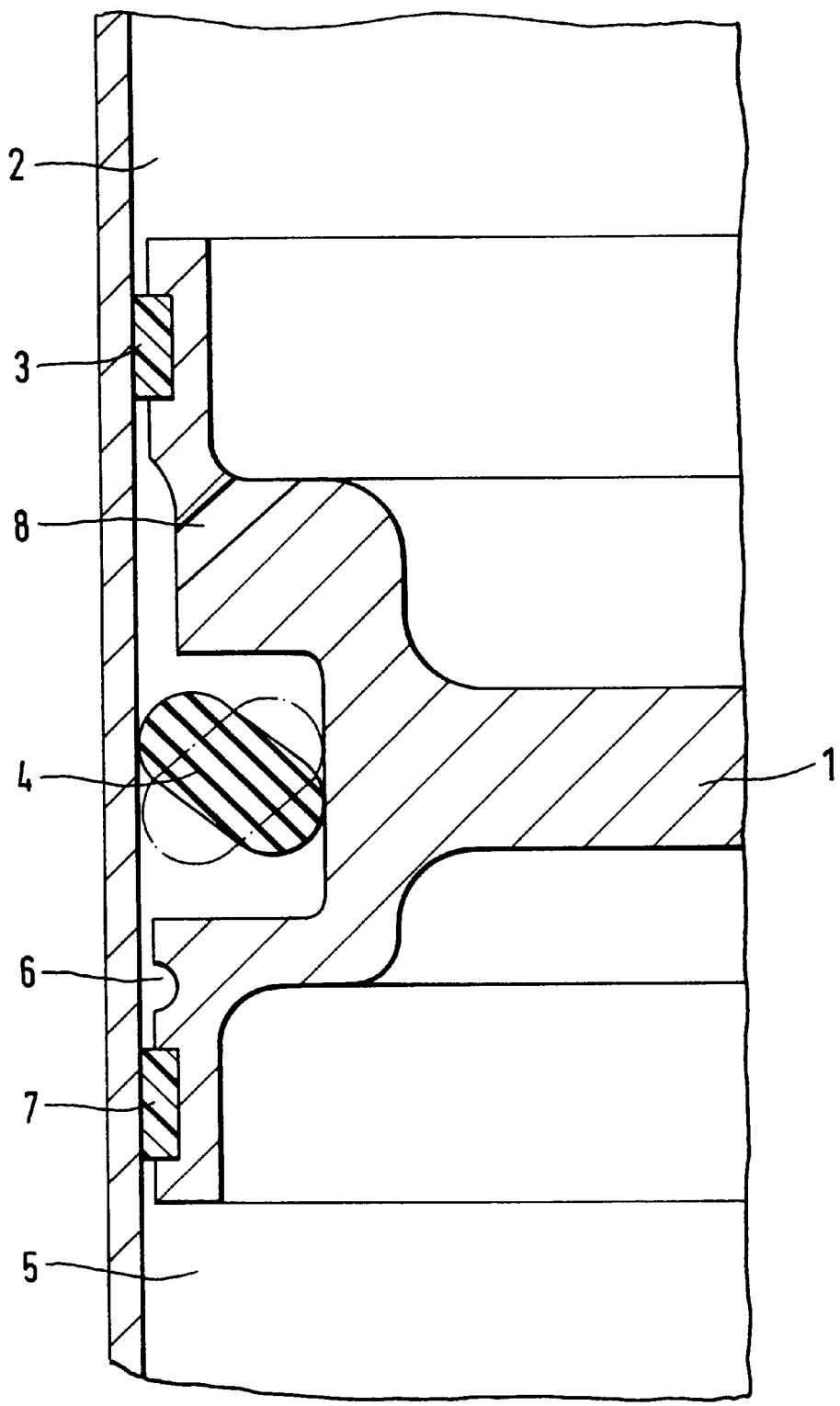
FIG. 3 shows detail X of FIG. 1 which illustrates one embodiment of a separating piston.

FIG. 3 shows a possible embodiment of a separating piston 1 in which the guide 3 and the additional guide 7 are received in the separating piston 1 as annular elements. The seal 4 is located in a chamber and changes its cross-sectional shape depending on the movement direction of the separating piston 1 (shown in dashes), so that damping fluid is conveyed from the fluid space 2 into the chamber 6 via the pumping action, wherein this damping fluid is returned from the chamber 6 to the fluid space 2 in the opposite direction. The explanation for this is that equal pressure prevails between the fluid space 2 and the pressure gas space 5. The chamber 6 can easily be incorporated into the separating piston 1 as an annular groove.

The invention is not limited by the embodiments described above which are presented as examples only but can be modified in various ways within the scope of protection defined by the appended patent claims.

We claim:

1. A separating piston for a vibration damping system having a cylinder which is partially filled with damping fluid and partially with pressure gas, the separating piston being arrangable in the cylinder so as to separate a pressure gas space from a fluid space in a sealing manner, the separating piston comprising:

a piston body having a longitudinal axis;

a guide mounted in the piston body so as to guide the piston body in the cylinder;

a seal for sealing the gas space from the fluid space; and an additional guide mounted in the piston body between the seal and an end side of the piston body facing the pressure gas space, a chamber being arranged in the piston body in an area between the seal and the additional guide so as to be open relative to an inner wall of the cylinder, the seal being arranged between the guide and the additional guide at an axial distance from both the guide and the additional guide so as to be separated from both guides.

2. A separating piston according to claim 1, wherein the chamber is an annular groove in an outer circumference of the piston body.

3. A separating piston according to claim 1, wherein at least one of the guides is an annular element.

4. A separating piston according to claim 1, wherein the guides are at least partially formed from a material provided with favorable friction characteristics.

5. A separating piston according to claim 4, wherein the material is tertafluorethlene.

6. A separating piston according to claim 1, wherein the seal is acted upon directly by damping fluid.

7. A separating piston according to claim 6, wherein a recess is arranged in the separating piston so that pressure acts upon the seal.

8. A separating piston according to claim 1, wherein the chamber is arranged directly adjacent to the seal.

\* \* \* \* \*